July 12, 1955 W. H. STORRS ET AL 2,712,987
ABRADING BELT AND METHOD OF MAKING IT
Filed Oct. 9, 1951 4 Sheets-Sheet 1

INVENTORS
Arthur J. Wells
William H. Storrs.
BY
ATTORNEYS.

July 12, 1955

W. H. STORRS ET AL 2,712,987

ABRADING BELT AND METHOD OF MAKING IT

Filed Oct. 9, 1951

INVENTORS.
Arthur J. Wells
William H. Storrs.
BY
ATTORNEYS.

July 12, 1955 W. H. STORRS ET AL 2,712,987
ABRADING BELT AND METHOD OF MAKING IT
Filed Oct. 9, 1951 4 Sheets-Sheet 3

INVENTORS
Arthur J. Wells
William H. Storrs.
BY

ATTORNEYS.

July 12, 1955 W. H. STORRS ET AL 2,712,987
ABRADING BELT AND METHOD OF MAKING IT
Filed Oct. 9, 1951 4 Sheets-Sheet 4

INVENTORS
Arthur J. Wells.
William H. Storrs.
BY

ATTORNEYS.

United States Patent Office 2,712,987
Patented July 12, 1955

2,712,987

ABRADING BELT AND METHOD OF MAKING IT

William H. Storrs, West Hartford, and Arthur J. Wells, Bloomfield, Conn., assignors to The Hartford Special Machinery Co., a corporation of Connecticut Application October 9, 1951, Serial No. 250,404

17 Claims. (Cl. 51—293)

The present invention relates to the process of making abrasive bodies, especially abrasive belts, and to the abrasive bodies themselves.

A purpose of the invention is to construct an abrasive body of nylon, and to concentrate abrasive particles at one or more outer surfaces thereto, bonding the particles to the body by the nylon itself.

A further purpose is to imbed abrasive particles in an abrasive body of nylon by softening the surface of the nylon under the action of a solvent, applying the abrasive particles to the softened surface, and removing the solvent, while preventing attack on the interior of the body by the solvent.

A further purpose is to prewet the abrasive particles, suitably diamond particles, with the nylon solvent and desirably also with dissolved nylon before applying the particles to the surface of the nylon and desirably also to preliminarily soften the nylon before the particles, along with the solvent and permissibly with the dissolved nylon, engage the surface of the nylon body.

A further purpose is to increase the strength and flexibility of belts and the like mounting abrasive particles.

A further purpose is to render abrasive belts more impervious to humidity in the air, and to attack by various liquids, whether applied as coolants or whether employed in washing.

A further purpose is to increase the life and reduce the cost of abrasive belts and other abrasive bodies.

A further purpose is to reduce the time of abrading operations, particularly on very hard materials.

A further purpose is to reduce the sensitivity of abrasive belts and other bodies to aging.

A further purpose is to render abrasive belts and other bodies less sensitive to heat.

A further purpose is to reduce the loss of abrasive particles in abrading hard work.

A further purpose is to permit accurate control of the depth of penetration of abrasive particles into a backing material.

A further purpose, especially in the case of coarse abrasive particles, is to add the particles first to the surface of the nylon and subsequently to apply a solvent to the surface at points at which the abrasive particles are located.

A further purpose is to control the rapidity of removal of the solvent, and further to cure the surface of the nylon after the bulk of the solvent has been removed.

A further purpose is to relate the volume of solvent to the volume of abrasive particles, suitably in a ratio between 1 to 1 and 2 to 1 and preferably in the ratio 1½ to 1.

A further purpose is to employ the nylon in the form of a monofilament.

A further purpose is to make up the nylon in the form of a woven belt and weld the surface by the action of the solvent, applying the abrasive particles at the welded surface.

A further purpose is to orient the nylon, preferably by stretching, and desirably before the abrasive is applied to the surface, and to retain the orientation condition in the body of the nylon while softening the surface to imbed the abrasive particles.

A further purpose is to weld the ends of the nylon belt by cutting them diagonally in the form of a butt joint, softening the nylon at the joint by solvent, clamping the ends together, applying pressure and removing the solvent.

A further purpose is to orient the nylon in the weld by cold work, suitably stretching.

A further purpose is to machine or otherwise form the surface of the nylon body before imbedding the abrasive particles in the machined surface.

A further purpose is to machine or otherwise form the surface of the nylon body to conform to a curve in cross section, suitably a convex or concave curve, and to imbed the abrasive particles in the surface of the curved cross section.

A further purpose is to machine the surface of the nylon into a curve in cross section which will render the surface flat under stretch, and to imbed the abrasive particles in the surface thus machined.

A further purpose is to imbed the abrasive particles in the softened surface of the nylon by application of pressure.

A further purpose is to permit more effective abrading of materials which have been difficult to machine, such as cemented carbide and hard steels and other objects such as glass and ceramics.

A further purpose is to reduce the tendency of abrasive bodies to load up with particles removed from the work in machining.

A further purpose is to permit removing of the abraded particles from the surface of the abrading tool by washing.

A further purpose is to provide a surface of abrasive particles on the flat face of a disc, concentrating the particles at the surface.

A further purpose is to provide a circumferential outer surface of concentrated abrasive articles on a disc or wheel of nylon.

A further purpose is to provide a conical surface of rotation on a nylon tool and to concentrate abrasive particles in the conical surface and bond the particles to the tool by the nylon itself.

Further purposes appear in the specifications and claims.

In the drawings we have chosen to illustrate a few only of the numerous embodiments in which our invention may appear, selecting the forms shown from the standpoints of convenience in illustration, satisfactory operation and clear demonstration of the principles involved.

Describing in illustration but not in limitation and referring to the drawings.

In the prior art the service life of abrasive belts and other abrasive bodies including diamond particles or other abrasive materials has been comparatively limited. Numerous causes have contributed to early failure and poor functioning of prior art abrasive bodies. The strength of the backing material has often been limited, and the flexibility in many cases has been poor. The individual abrasive particles have often been rigidly held, so that, under the conditions of shock and impact encountered in grinding, particles have quickly become dislodged and the abrasive has been depleted from the surface. Also the very rigid mounting of the abrasive particles tends to make projecting portions vulnerable to breakage.

In prior art belts, there has been great sensitivity to environment. Many of the prior art abrasive belts have aged rapidly, and have been sensitive to conditions of relative humidity, and contact with liquids used as coolants and cutting fluids, such as water and oil. There also has been great sensitivity of such prior art abrasive belts to the temperatures created in grinding. Due to these and other conditions, the life has been comparatively short, and the speed of cutting, especially on hard materials such as cemented carbides has been limited.

An effort has been made by Catlin U. S. Patent No. 2,154,436, granted April 18, 1939, for Abrasive, to improve the character of abrasive compositions by intimately mixing abrasive particles with synthetic linear condensation polyamide, commonly called nylon. Unfortunately in the Catlin form the nylon is not placed in the best physical condition for use as an abrasive composition, and much of the abrasive is undesirably placed in the interior of the composition, where it reduces the physical properties of the nylon and is not available for abrading. Where very expensive particles such as diamond particles are used, the location of such particles in the interior of the nylon body is very wasteful.

In accordance with the present invention, abrasive particles are embedded in the nylon body only at the surface, and the nylon is desirably retained in the best physical condition for use at other parts of the cross section. Accordingly, the tendency of the nylon to yield or otherwise stretch is greatly reduced, while at the same time the most advantageous combination of strength and flexibility in the nylon is obtained.

In accordance with the present invention, the nylon throughout the belt or other abrasive body, except at the surface where the abrasive is applied, is very desirably in oriented condition, with maximum tensile strength (which may be of the order of 16,000 p. s. i.) and the flexibility is at a maximum.

As compared with many of the prior art diamond belts and other abrasive belts which are on the market, the belts and other abrasive bodies of the present invention do not require control of relative humidity during storage, and are impervious to the presence of moisture and other common liquids. This means that any of the usual coolants can be used without damage, such as water, and mineral or vegetable oils. Furthermore the abrasive bodies of the present invention are so insensitive to moisture that abraded particles from the work can be removed by washing with soap and warm water. Such cleaning of belts and other abrasive bodies by washing is greatly favored by the smooth impervious character of the nylon, and its resistance to particle penetration which prevent picking up of particles in the nylon surface during abrading operations.

The nylon belts and other abrasive bodies of the present invention are quite resistant against aging and do not deteriorate after extended exposure to air.

The nylon abrasive bodies under discussion are also relatively insensitive to heat, and can be used at comparatively high ambient temperatures and also under abrading conditions which develop considerable heat which is picked up by the belt or other tool.

One of the very important properties possessed by the abrasive bodies of the present invention is the tendency to hold abrasive and avoid loss of abrasive. This is due in part to the fact that the nylon which bonds and sockets the abrasive particles is resilient and absorbs shock on the particles, thus preventing them from breaking or tearing out of the sockets. In actual experience it has been found that whereas diamond tools of the prior art would last only for the polishing of 8 to 10 carbide dies, diamond belts of the present invention will last for the polishing of 400 to 500 comparable dies. The saving due to this great increase in life has been found to be from 15 to 20 percent of the cost of the polishing operation, and much greater in some cases.

It has also been found that the better mechanical properties, especially strength and resilience, have a tendency to prevent loss of abrasive particles. The reduced sensitivity to heat and moisture and greater life permit grinding more rapidly and under more severe conditions, by which in an individual case the time of polishing a particular die has for example been reduced from four hours to forty minutes.

The abrasive employed in accordance with the present invention may be any one of the well known abrasive materials, but as the invention finds its widest application in the abrading of very hard materials, such as polishing cemented carbide draw dies, rolls for rolling mills, and steel draw dies and scoop blades, polishing of flats on prisms of glass lenses, grinding of irregular curved glass lenses, and grinding of thread guides in ceramics, the invention will in most cases be applied with diamond particles to obtain maximum hardness. Various sizes of abrasive particles may be used, typical grades for different abrasive applications being the following:

100 mesh per linear inch
200 mesh per linear inch
40 to 52 micron
10 to 20 micron
1 to 5 micron Other suitable abrasive particles will be used, among which are alumina, Carborundum, and the like. The quantity of abrasive employed in the case of diamond particles will be explained below in discussing the table.

It will be understood of course that the abrasive will vary in chemical character, size, quantity per unit area of the belt or other body, and depth of penetration, although in any case the abrasive will be concentrated close to the surface. One of the features which is important in controlling depth of penetration into the softened surface of the nylon is the time of penetration and the pressure where pressure is applied to promote penetration. It is usually desirable to have an abrasive particle layer on the surface of between two and three grains thickness, that is, between two or three grains lie below one another in depth and immediately adjoining relationship.

As later explained the abrasive may be applied dry, or may be added in a mixture with a solvent and if desired with dissolved nylon.

The base material will be synthetic linear condensation polyamide, or nylon. Typical examples of compositions of the nylon which are suitable for the present invention are described in the Catlin patent above referred to. Suitable nylons are also described in U. S. Patents Nos. 2,071,250 and 2,071,253. A preferred type of nylon is polyhexamethylene adipamide. The nylon used will preferably have an intrinsic viscosity above 0.4 as defined in the Catlin patent. The nylon may vary in chemical composition, ambient temperature and moisture content without interfering with the processes of the invention.

The nylon is softened at the surface by a nylon solvent, which may be of any well known character. The acids of the formic acid series, such as formic, acetic, etc. up to and including five carbon atoms in the carbon chain (not including the carboxyl group) may be used. Likewise the phenols are suitable, of which phenol and the cresols, particularly metacresol, may be used. Xylenol is also suitable. Any other nylon solvent may be used.

The solvents are normally employed in concentrated form. In the case of phenol, a solution of 88% phenol and 12% water by weight is normally used.

The solvent is applied in sufficient quantity and for sufficient time so that it will soften the surface, and not sufficient to change the structure of the nylon beneath the surface and in no case is the solvent permitted to dissolve the whole mass of the nylon.

Figure 1:
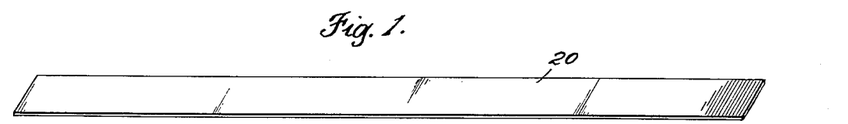
Figure 1 is a perspective of a nylon monofilament strip from which the belt of the invention may be constructed.
Figure 2:
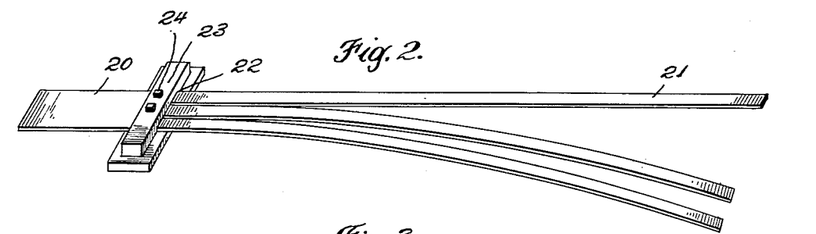
Figure 2 is a perspective of the strip of Figure 1 undergoing slitting into several belts.

Considering now the illustrations of the drawings, Figure 1 shows a strip of nylon monofilament 20, suitably made by extrusion, and not as yet oriented. Monofilament is the preferred raw material for making abrasive belts in accordance with the invention. It will be understood that the strip may of course be secured in oriented form, in which case orientation is not necessary. Figure 2 illustrates the slitting of the broad strip 20 into narrow strips 21 of a character suitable for making individual belts. This is permissibly accomplished by forcing the strip 20 through an opening 22 of a slitting die 23 between sharpened slitting knives 24. Any other suitable method of slitting may be used. It has been found that the slitting of the nylon is easier if the nylon is soaked in water before slitting, and accordingly the strip 20 is desirably given a water soaking before slitting.

Figure 3:
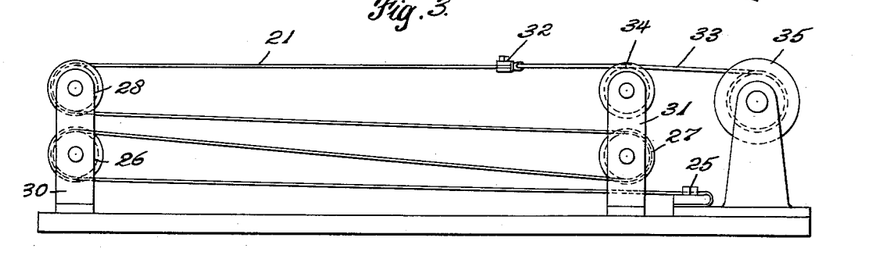
Figure 3 is a side elevation showing the orientation of a single belt produced according to Figure 2.

After slitting into separate strips 21, the nylon is very desirably oriented to increase the strength and to eliminate the tendency of the belt to stretch. This is accomplished by cold work, suitably stretching, as shown in Fig. 3. As illustrated in Figure 3, the strip 21 is anchored at one end to a clamp 25 and threaded back and forth between rotatable pulleys 26, 27 and 28 on spaced stands 30 and 31. The remote end of the strip is held by a clamp 32 which is pulled by a cable 33 guided by pulley 34 on stand 31 and wound by a winch 35 having a suitable power drive (not shown).

It is desirable that the stretching to orient the microcrystalline structure of the nylon should be to approximately the elastic limit. Usually the total length at the end of stretching is about four times the initial length, and after releasing the oriented nylon shrinks to about three times the initial length. The orientation of the nylon gives it a tensile strength of the order of 16,000 p. s. i., and minimizes further stretching.

To reduce the amount of energy required to orient the nylon, it is desirably soaked in water before orienting.

The oriented belt strip 21 of Figure 3 is next welded or joined at the ends to make an endless belt, where such is to be produced.

Figures 4, 5, 5A, 6, 7, 8:
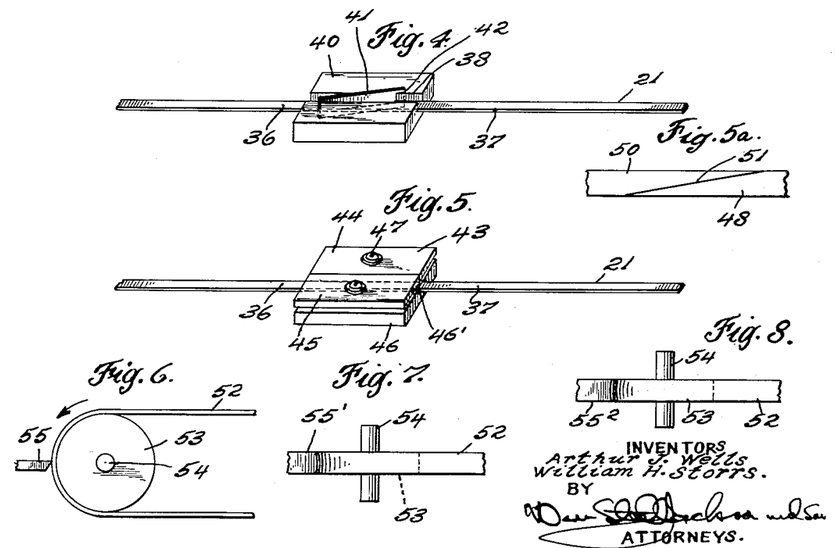
Figure 4 is a perspective showing the cutting of the ends of a belt preparatory to joining.
Figure 5 is a perspective illustrating the clamping of the ends to make a weld after application of the solvent.
Figure 5a is a fragmentary plan view of the completed joint or weld.
Figure 6 is a fragmentary elevation showing the machining of the surface of a belt.
Figure 7 is a fragmentary plan view showing the machining of a concave surface on the belt.
Figure 8 is a fragmentary plan view showing the machining of a convex surface on the belt.

In making the weld, it is desirable to cut the opposite ends of the belt diagonally, preferably at an angle of about 15°, to make an angular butt joint. The diagonal cutting may be in the direction diagonal to the major cross sectional dimension, or the minor cross sectional dimension or any combination thereof. This cutting is desirably accomplished by inserting the opposite ends 36 and 37 of the belt strip into a guiding recess 38 of a cutting fixture 40. The opposite ends will overlap for the full length of the diagonal cut. A blade 41, suitably a razor blade, held in diagonal guiding slots 42, is then forced down under any suitable pressure to cut both ends diagonally and form opposite abutting diagonals.

The opposite abutting diagonals are then brought together as in clamping fixture 43 of Figure 5, so that the diagonal cuts mate and the two ends are in extension of one another, and any of the nylon solvents mentioned above is applied in the concentration mentioned. The result is to soften the mating edges. The two opposite ends 36 and 37 are then gripped between top clamp portions 44 and 45 and bottom clamp portion 46 as by screws 47. The bottom clamp portion suitably has a groove 46' to engage the edges of the belt. The clamp holds the opposite portions of the joint flat and in smooth relationship. The result is a perfectly smooth joint strongly uniting the two oriented ends of the nylon band by a thin weld zone of equiaxed microcrystalline composition formed after the evaporation of the solvent from the softened zone. This is illustrated in Figure 5a where the nylon at 48 and 50 is oriented and the nylon in the weld 51 is equiaxed.

The time of clamping will vary but it is desirable to clamp the belt for about 12 hours to allow the solvent to evaporate. After the clamp is removed, the endless belt, removed from the clamp, is suitably exposed to the air for about 24 hours to permit the removal of the last trace of solvent and to cure the joint. The curing can be accelerated at elevated temperature.

It has been found that the joint just described is thoroughly resilient and strong and much superior to other joints such as fused joints, which have been found to be very brittle.

The equiaxed material 51 of the weld will, where desired, be oriented by restretching the belt under conditions similar to those of Figure 3, except that the belt is doubled and the ends are suitably held, as over pulleys. This serves to orient the weld material and somewhat increases the strength and reduces the stretch.

After completion of the welding of the belt, it is in some cases desirable to machine the surface on which the abrasive is to be applied in order to obtain a desired flatness or shape. In Figure 6 the endless belt 52 produced in Figure 5 is stretched between two pulleys 53 (only one of which is shown), one of the pulleys having a flat outer rim to support the belt evenly, and the pulley is turned in the direction of the arrow as by turning its shaft 54 in suitable bearings not shown.

The outside circumference which in this case is to receive the abrasive, is engaged by a shaving tool 55, which planes the outside to create a flat surface in the form of Figure 6. While a stationary shaving tool has been shown, it will be understood that any character of planing tool may be used, or any other type of machining operation may be performed, including filing and grinding.

In some cases it is desirable to produce a concave cross sectional contour of the outer surface of the belt, and this is illustrated in Figure 7 where a convex tool 55' cuts a concave groove in the outer surface of the belt, which is later to receive the abrasive. A very slight concavity may be desirable in a belt to counteract the tendency of the edges to stretch somewhat more than the middle. Thus a belt having a slight concavity under a particular tension may be actually flatter than a belt which was initially machined flat, as the concavity compensates for the greater stretch at the edges.

In some cases, as for machining concave surfaces, a convex cross sectional contour may be created as shown in Figure 8 where a concave tool 55² forms a convex ridge on the outer surface of the belt.

It will be evident that any other cross sectional contour of the belt may be produced.

In the forms heretofore described, a monofilament has been illustrated. The belt may however be a woven belt, for example as woven by the common practice of weaving endless belts.

Figure 9:
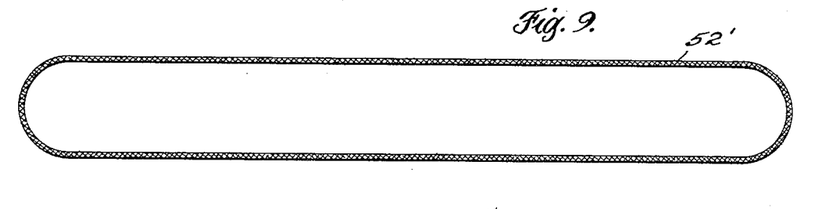
Figure 9 is a side elevation of an endless woven belt according to the invention.

In Figure 9 a woven endless belt 52' of nylon is shown, the nylon filaments used in the belt having preferably been oriented by stretching before weaving. Fish line leader will in some cases be used as yarn. The woven belt of Figure 9 will function similarly to the monofilament belt earlier described except that in the case of the woven belt the application of solvent to the surface causes the belt at the surface to soften and the nylon flows together as a mass at the surface, the individual filaments being joined together at the surface, while the belt beneath the surface retains its oriented character and its individual filament character.

Figure 10:
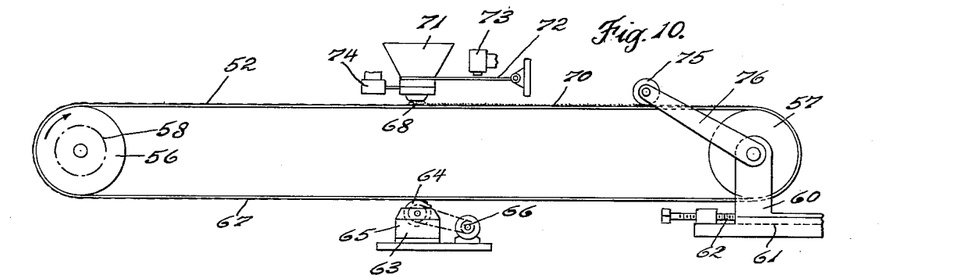
Figure 10 is a diagrammatic side elevation of mechanism for applying the abrasive to the outer surface of the belt.

Figure 10 illustrates one procedure for the application of the abrasive particles, suitably diamond particles, to the desired surface of the belt. In this instance, the endless belt 52, which may be a monofilament belt or a woven belt, is stretched between pulleys 56 and 57. Pulley 56 is on suitable bearings, not shown, and is driven at a controllable rate by a drive connected to gear 58. Thus by changing the speed of the drive the speed of progression of the belt can be changed. Pulley 57 is mounted on bearing supports 60 which slide in ways 61 and are adjustable by manipulating screw 62 to adjust the tension of the belt.

A suitable solvent applicator 63 contacts the belt at a position before the belt receives the abrasive powder, allowing enough lead time before the application of the abrasive powder to soften the surface. The solvent feed 63 suitably consists of a roll 64 dipping into a tank 65 of solvent and turned at a controllable predetermined rate by drive 66 which adjusts the feed of the solvent. The amount of solvent added is just sufficient to soften the nylon at the surface and for a minute distance below the surface, but not sufficient to soften or change the nylon substantially beneath the surface of the belt. In a typical application it has been found to be desirable to use about 0.035 milliliter of solvent per square inch of belt surface, the solvent concentration being as specified above.

From the solvent application, the belt advances over a stretch 67 before it encounters the abrasive particles in this form of the invention. This time for solvent penetration into the nylon is important. More time should be allowed with coarse abrasive than with fine abrasive, although too much time causes excessive penetration and weakens the body of the belt. The lead time for solvent application may vary widely, but for example depending upon the solvent, concentration and temperature may be from 15 seconds to 2 minutes. At point 68 abrasive particles 70 are applied suitably under action of gravity from hopper 71 supported on resilient mounting 72 vibrated by vibrator 73 and having a valve 74 controlling the rate of flow of abrasive. In one embodiment of the invention, the abrasive particles 70 are applied dry, and for many purposes this manner of application is adequate.

While application of abrasive has been shown from a vibrating hopper, it will be understood that abrasive can be applied under an electrostatic field or other means of causing uniformity of distribution. Abrasive and solvent may also be applied by hand, as by a paddle.

The abrasive particles at 70 resting on the surface of the nylon, penetrate and become embedded in the surface softened layer of the nylon, and in most cases this result is obtained without the need for pressure. However, where desired pressure can be applied, as from roll 75 resting on the surface of the belt and pivoted in arms 76 which swing on the shaft of pulley 57. The pressure will be varied by varying the size and weight of pressure roll 75, or by urging the roll against the belt by a spring.

In applying the abrasive to the surface, the belt may to advantage be run around the device two or three times to apply several layers of abrasive and secure greater uniformity of distribution. The abrasive particles of the last coat will preferably stick out and make the outside of the belt perceptibly rough.

The weld at the joint will receive a uniform layer of abrasive like all other parts of the outside of the belt, and this uniformity of the abrasive layer across the joint is one of the great advantages of this method of application.

The amount of diamond dust to be employed is shown by the table, which illustrates the quantities which should be used for belts of different types.

After the completion of the abrasive application, the belt should be allowed to dry to remove solvent. Ordinarily with a belt of 3/16" width and 75" length, a drying time of 60 minutes in air at ambient temperature is sufficient. Before the drying, the application of solvent and of abrasive powder is stopped.

After drying the belt will be cured before being put in service. Exposure to air at ambient temperature for about 10 days is desirable as a procedure for curing, although curing can be carried on under elevated temperature conditions if desired.

It will be evident of course that the time for evaporation of the solvent is a function of the quantity of solvent solution, the concentration, the humidity, the temperature and the particular solvent used. Too rapid evaporation causes insufficient penetration and too slow evaporation may result in excessive penetration.

Figure 10A:
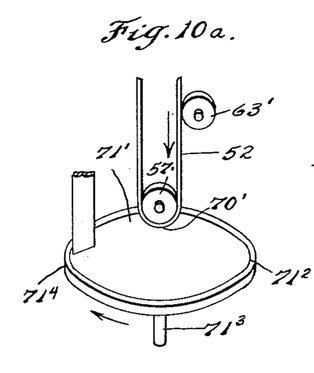
Figure 10a is a fragmentary diagrammatic perspective of a variant of Figure 10.

It has been found to be advantageous to apply the abrasive (or the abrasive and the solvent) to the surface of the belt by moving the belt in a path which intersects the top of a mass of abrasive powder with or without solvent. This is illustrated in Figure 10a, in which the belt 52 is brought down as shown by the arrow suitably against solvent applicator 63', where a suitably controlled layer of solvent with or without dissolved nylon is applied, and then undergoes a reverse bend at the bottom around pulley 57'. The lowermost portion of the belt surface at 70' intersects the upper surface of a suitably levelled mass of abrasive at 71' (the abrasive will, if desired, be dry, although solvent may be admixed with the abrasive).

Table

| Grade | Length, Inches | Width, Inches | | | | | |
|---|---|---|---|---|---|---|---|
| | | 1/16 | 1/8 | 3/16 | 1/4 | 5/16 | 3/8 |
| 0-2 Micron | 75 | .45 | .9 | 1.35 | 1.8 | 2.25 | 2.7 |
| | 104 | .6 | 1.2 | 1.8 | 2.4 | 3 | 3.6 |
| 1-3 Micron | 75 | .45 | .9 | 1.35 | 1.8 | 2.25 | 2.7 |
| | 104 | .6 | 1.2 | 1.8 | 2.4 | 3 | 3.6 |
| 1-5 Micron | 75 | .45 | .9 | 1.35 | 1.8 | 2.25 | 2.75 |
| | 104 | .6 | 1.21 | 1.82 | 2.43 | 3.03 | 3.64 |
| 5-10 Micron | 75 | | | | | | |
| | 104 | | | | | | 3.1 |
| 10-20 Micron | 75 | .55 | 1.1 | 1.65 | 2.2 | 2.75 | 3.3 |
| | 104 | .74 | 1.48 | 2.23 | 2.96 | 3.71 | 4.46 |
| 20-40 Micron | 75 | | | | | | |
| | 104 | | | | | | 5.8 |
| 40-52 Micron | 75 | 1.25 | 2.5 | 3.75 | 5 | 6.25 | 7.5 |
| | 104 | 1.67 | 3.37 | 5.06 | 6.74 | 8.43 | 10.12 |
| 230-325 Mesh | 75 | | | | | | |
| | 104 | | | | | | 9.7 |
| 170-230 Mesh | 75 | 2 | 4 | 6 | 8 | 10 | 12 |
| | 104 | 2.7 | 5.4 | 8.1 | 10.8 | 13.5 | 16.2 |
| 120-170 Mesh | 75 | | | | | | |
| | 104 | | | | | | 14.25 |
| 100-120 Mesh | 75 | 2.75 | 5.5 | 8.25 | 11 | 13.75 | 16.5 |
| | 104 | 3.71 | 7.42 | 11.14 | 14.84 | 18.56 | 22.28 |
| 80-100 Mesh | 75 | | | | | | |
| | 104 | | | | | | 17.4 |
| 60-80 Mesh | 75 | | | | | | |
| | 104 | | | | | | 18.2 |
| 40-60 Mesh | 75 | | | | | | |
| | 104 | | | | | | 19 |

It has been found that the level of the abrasive mass at 71' can be conveniently controlled by holding the abrasive in a tray 71² suitably rotated on shaft 71³, and having excessive abrasive beyond the desired level removed by doctor blade 71⁴, which encounters the abrasive in the tray before the abrasive reaches the belt.

Figure 11:
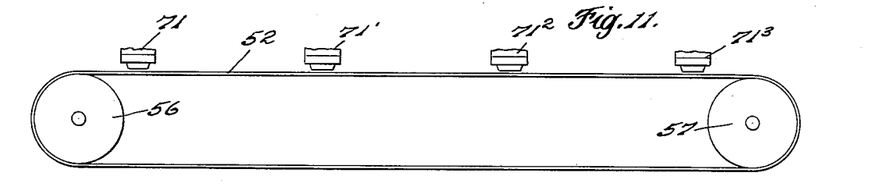
Figure 11 is a view corresponding to Figure 10, showing a variation.

In Figure 10 a single hopper for application of abrasive powder has been shown. In some cases, several layers of abrasive may be applied from successive hoppers. This is illustrated in Figure 11, which omits the mechanism 64 for adding the solvent but shows a succession of hoppers 71, 71', 71² and 71³, each of which applies abrasive particles to the belt which has received a previous application of solvent.

In some cases it is preferable to apply the abrasive with a premixture of solvent and dissolved nylon. It has been found to be best in employing a premixture of solvent and diamond powder to use from one to two volumes of solvent of the concentration described per volume of diamond dust, preferably one and a half volumes of solvent per volume of diamond dust.

In the case of application of a premixture of abrasive, solvent and dissolved nylon, the desired concentration range will preferably be 50 to 200 volumes of solvent to one volume of nylon.

The application of the abrasive along with solvent or with solvent and dissolved nylon has the advantage that the particle is prewet and time will not be lost during which the liquid wets the particle. Also this combines the application of the solvent and the abrasive, so that in some cases the preliminary application of solvent can be avoided. Furthermore this procedure avoids dust and reduces the waste of diamond dust and the danger to the personnel from absorbing dust.

Figure 12:
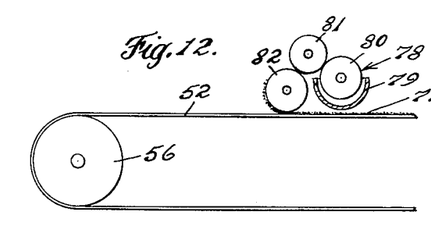
Figure 12 is a fragmentary view corresponding to Figure 10 showing a further modification.

Figure 12 shows the application of a mixture of solvent and abrasive 77 to the belt. The mixture 77 may be a mixture of abrasive particles, solvent and dissolved nylon.

The feeder 78 may be any well known type of feeder, having a hopper 79 which contains the mixture of abrasive and liquid, picked up by roll 80 from the hopper, fed from roll 80 to roll 81, and from roll 81 to roll 82, which engages the belt.

In some cases it is desirable to employ successive increments of prewetting of the nylon belt 52 with solvent, and in Figure 13 a device is illustrated which applies solvent with or without admixture with dissolved nylon through coating applicators 83 and 84 (like that shown in Figure 12), and subsequently applies a mixture of abrasive particles and solvent with or without dissolved nylon to the outer surface of the belt from feeder 78. It will be understood, of course, that the feeders, suitably of roll type, may be of any well known form which will apply liquid. The form of Figure 13 is particularly suitable for use in case of very high humidity or of a considerable amount of moisture on the nylon belt.

Figure 13:
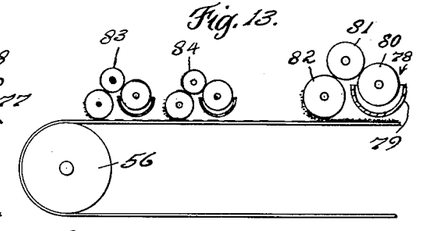
Figure 13 is a view corresponding to Figure 10 showing a still further modification.

It will be understood, of course, that several layers can be applied by running the belt around several times in the form of Figures 12 and 13.

It will further be understood that the pretreatment with solvent shown in Figure 13 can, if desired, be applied to only part of the area to be coated with abrasive, for example, only the edges or only the interior, as desired.

Figure 14:
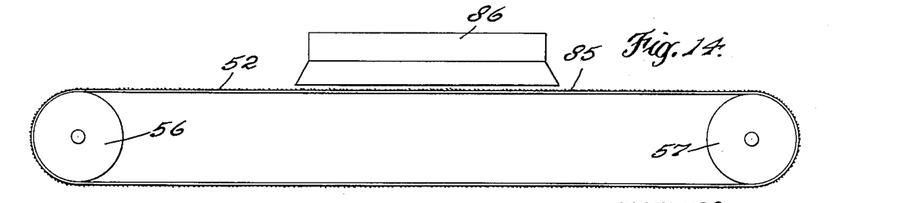
Figure 14 is a side elevation showing a dryer.

After the coating of the belt is complete, it will in many case be desirable to use artificial drying for the drying and aging steps. Thus in Figure 14 the belt 52 completely coated with two or three grains deep of abrasive particles embedded at 85 is progressively passed under dryer 86, suitably a bank of infrared lamps. The temperature attained on the belt may to advantage be as high as 200° F. Dryers providing hot air circulation suitably at a temperature of 200° F. or less may also be used if desired.

Figure 15:
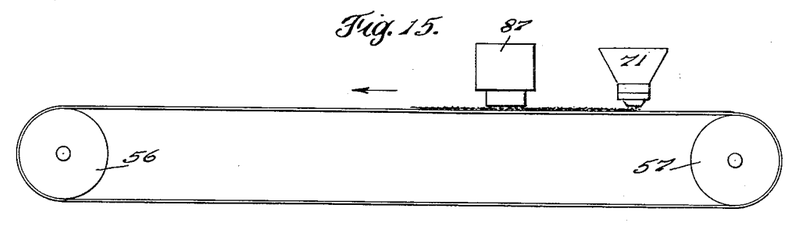
Figure 15 is a diagrammatic side elevation showing a different manner of abrasive application.

In case of coarse particles of abrasive, it has been found that uniform admixture with solvent cannot be obtained. In such cases it may be desirable to apply the abrasive particles in dry form to the dry belt, and subsequently apply the solvent. This can be achieved with the device of Figure 15, applying dry abrasive through hopper 71 and subsequently applying liquid solvent as by multiple spray heads 87.

Figure 16:
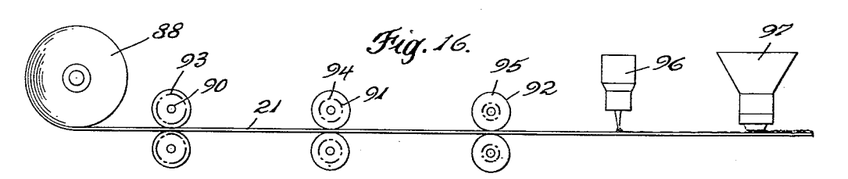
Figure 16 is a diagrammatic side elevation of mechanism for orienting a monofilament of great length and applying abrasive.

In some cases it is desirable to orient the nylon belt and embedded abrasive on one surface as a continuous operation. In this case the belt can be welded together to make an endless belt at a later stage after the application of the abrasive using the technique of Figures 4 and 5 for welding or can be used in reciprocating applications as a belt not having the ends joined. In the form of Figure 16, nylon monofilament is unrolled from a roll 88 and fed through pairs of driven feed rolls 90, 91 and 92, the rolls 90 being driven at slower speed by gears 93, the rolls 91 being driven at faster speed by gears 94 and the rolls 92 being driven at still faster speed by gears 95. The increase in speed is sufficient from one pair of rolls to the next to cause the stretch required to orient the nylon. The strip of nylon 21 receives solvent on the upper face from liquid applicator 96 and subsequently receives abrasive particles from applicator 97. The abrasive particles may either be dry or mixed with solvent and permissibly also with dissolved nylon as already explained.

Figures 17, 18, 19:
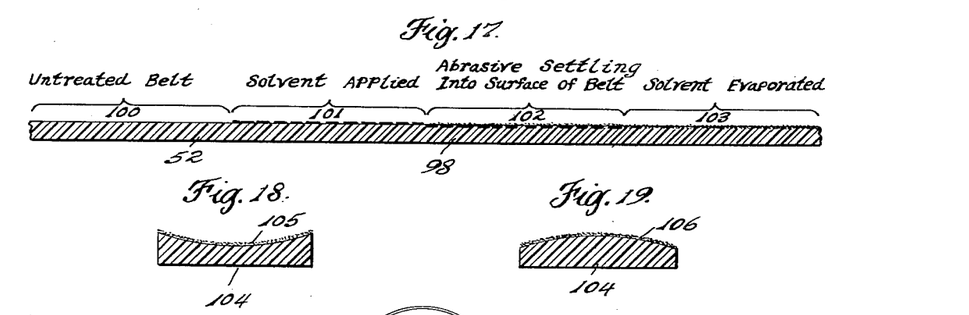
Figure 17 is an exaggerated longitudinal section showing the steps of application of the solvent and abrasive according to one form of the invention.
Figure 18 is an enlarged transverse section of a concave belt in accordance with the invention.
Figure 19 is an enlarged transverse section of a convex belt in accordance with the invention.

The final belt or other abrasive body produced is illustrated in enlarged form in Figure 17. The body 98 is oriented and unchanged by the coating. The progressive zones shown on the surface to receive the abrasive are zone 100 having an untreated surface, zone 101 which has solvent applied and is undergoing softening, zone 102 which has abrasive applied and in which the abrasive is settling and becoming embedded in the softened nylon, and zone 103 in which the solvent is evaporating and the belt is curing.

Figures 18 and 19 illustrate suitably exaggerated special curved cross sections produced in Figures 7 and 8 respectively. In this form the belt has a flat back 104, and a concave abrasive surface 105 which can be used in abrading convex surfaces (Figure 18) or a convex abrasive surface 106 which can be used in abrading concave surfaces (Figure 19). As already explained, the concave abrasive surface 105 will in some cases be only slightly concave and will then create a flat surface under belt tension.

Figure 20:
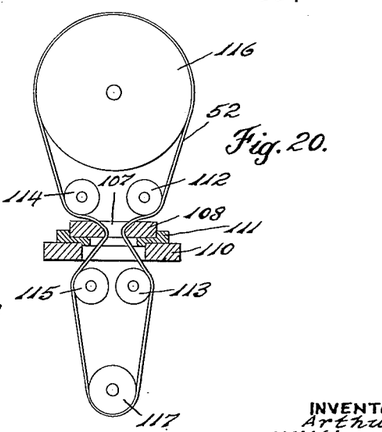
Figure 20 is a diagrammatic sectional elevation showing the use of a belt according to the invention in the polishing of a die.

The abrasive belt of the invention will be used in any well known manner for grinding, cutting, polishing or the like. In Figure 20 we illustrate the grinding or polishing of the internal surface 107 of a hard die 108, suitably a tungsten carbide draw die. The die has an annular opening and a curved approach surface and is conveniently mounted on a turntable 110 by a fixture 111. The die turns with the turntable. The belt 52 is made to conform to the surface to be ground by idling rolls 112, 113, 114 and 115 inside the belt which dispose it to the curvature of the die. The belt is driven at one end by driving pulley 116 and makes a reverse bend at the opposite end over pulley 117.

The speed of the abrasive surface of the present invention with respect to the work will normally vary between 40 and 8000 feet per minute, and will preferably be of the order of 5000 feet per minute. The pressure especially on sharp corners or other small areas may be of the order of several tons per square inch while on the other hand effective grinding can be done using pressures of a few ounces per square inch.

Figure 21:
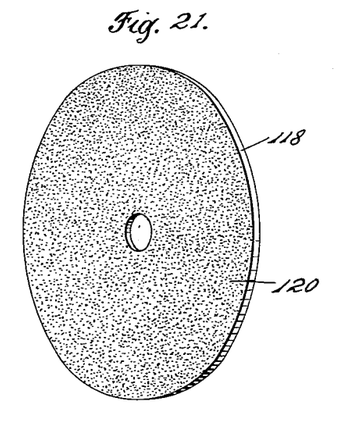
Figure 21 is a perspective of an abrasive disc in accordance with the invention.

While the invention has been shown applied to abrasive bodies of the belt type, it will be understood that it can also be applied to other forms of abrasive tools. In Figure 21 a nylon disc 118 is shown having abrasive particles embedded at one end surface 120, so as to permit face grinding. The material making up the nylon disc may be oriented in any suitable manner before the abrasive is applied, and the abrasive will be applied by any one of the techniques already described. Orientation is not in every case necessary.

Figure 22:
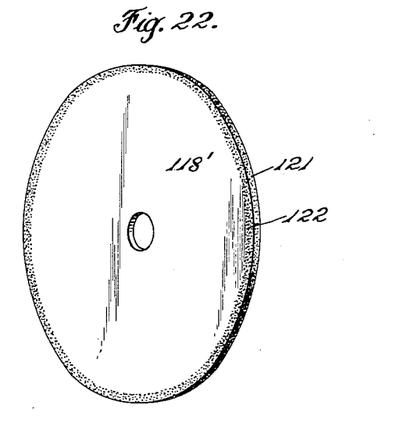
Figure 22 is a perspective of an abrasive cutting wheel in accordance with the invention.

Figure 22 shows a nylon disc or wheel 118' having an embedded abrasive layer 121 over the outer periphery, preferably about three grains deep, and abrasive layers 122 of similar depth over a rim of each end adjoining the periphery. This type of wheel may be used for cutting, grooving or other grinding.

Figure 23:
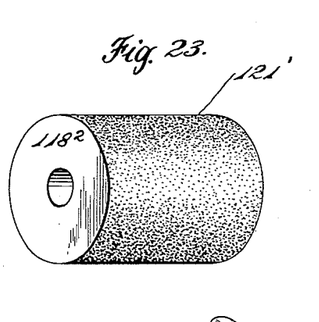
Figure 23 is a perspective of a cylindrical grinding wheel embodying the principles of the invention.

Figure 23 illustrates an abrasive wheel $118^2$ in which there is a wide circumferential abrasive layer 121'. This can be used for any type of grinding which would be performed by the circumference of a grinding wheel.

Figure 24:
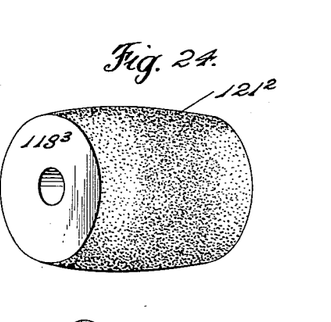
Figure 24 is a perspective of a convex grinding wheel in accordance with the invention.

In order to suggest that various contours of the circumferential surface will be employed, Figure 24 illustrates a wheel $118^3$ having a convex circumferential abrasive layer $121^2$ applied in accordance with the methods of the invention.

Figure 25:
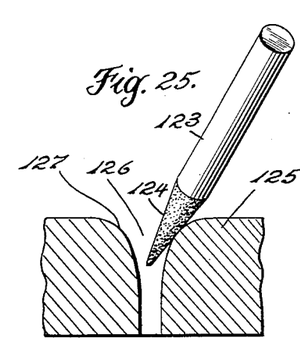
Figure 25 is a perspective of an abrasive pencil embodying the principles of the invention, and shown in operating position in work.

Other forms of abrasive bodies will be employed utilizing the principles of the invention. In Figure 25 nylon abrasive pencil 123 has a conical pointed embedded abrasive layer 124 in accordance with the invention, which may be used as shown by rotating the pencil about its own axis and turning the work 125 about the axis of the hole 126. Or, if desired, the pencil may be gyrated while the work remains stationary. Thus the approach surface 127 of the die can be polished or otherwise abraded.

Figure 26:
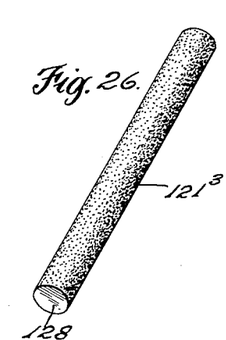
Figure 26 is a perspective of an abrasive rod according to the invention.

In Figure 26, a nylon rod 128 is shown having a circumferential layer of abrasive particles $121^3$ embedded in the circumferential outer surface by any one of the techniques of the invention.

Figure 27:
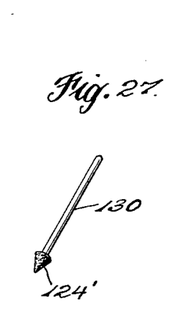
Figure 27 is a perspective of a conical abrasive tool, suitably a dental tool, embodying the principles of the invention.

In some cases the principles of the invention may be applied to special tools, as, for example, a nylon dental tool 130 having a conical embedded surface 124' of abrasive particles applied in accordance with any one of the techniques of the invention.

In general it will be understood that the abrading bodies may take various forms, but that the principles of the invention are equally applicable to these various forms, in order to embed the abrasive in the nylon at the surface, without impairing the structure of the nylon beneath the surface. Thus, whereas the bonding layer of nylon at the surface will normally be of equiaxed particles, the interior of the abrasive body will desirably be of oriented nylon.

When reference is made herein to the predetermined nominal grain size of the abrasive, it is intended to designate the controlling size of the screen through which the abrasive is sized, when considering the large sizes, or the controlling maximum size when considering the smaller sizes which are usually graded by sedimentation.

In view of our invention and disclosure, variations and modifications to meet individual whim or particular need will doubtless become evident to others skilled in the art to obtain all or part of the benefits of our invention without copying the process and article shown, and we, therefore, claim all such insofar as they fall within the reasonable spirit and scope of our claims.

Having thus described our invention, what we claim as new and desire to secure by Letters Patent is:

1. The process of producing an abrasive element, having abrasive grains at the surface of a predetermined nominal size, which comprises softening a surface of a base material consisting of synthetic linear condensation polyamide only adjacent the surface by a solvent to a depth not in excess of three times the nominal grain size, imbedding abrasive particles in the polyamide only where the surface is softened while retaining the interior of the polyamide unchanged, and removing the solvent.

2. The process according to claim 1, which comprises first cold working the base material to orient the same, and retaining the oriented condition of the polyamide at the interior when the surface is softened.

3. The process according to claim 1, in which the abrasive particles are diamond particles.

4. The process of making an abrasive belt, which comprises treating a belt of synthetic linear condensation polyamide with a mixture of abrasive particles and solvent for the polyamide and thereby softening the polyamide at the surface and only at the surface while retaining the body of the belt unchanged, and removing the solvent.

5. The process of making an abrasive body, which comprises treating a body consisting of synthetic linear condensation polyamide at at least one surface and only at the surface with a mixture of abrasive particles, solvent for the polyamide and dissolved polyamide while retaining the interior of the body unchanged, and removing the solvent.

6. The process of making an abrasive body, which comprises treating a body of synthetic linear condensation polyamide at at least one surface and only at the surface with a solvent for the polyamide, subsequently and while the solvent is still present and the body is softened only at the surface, treating the softened surface with a mixture of abrasive particles and solvent for the polyamide, retaining the interior of the body unchanged while imbedding the abrasive particles in the surface, and removing the solvent.

7. The process of producing an endless abrasive belt which has the property of abrading uniformly throughout its length, including the point of joining, which comprises diagonally cutting opposite ends of a belt of synthetic linear condensation polyamide to accomplish diagonal abutting relationship, applying solvent for the polyamide to the ends of the belt, clamping the ends of the belt together, removing the solvent from the joint, applying solvent to at least one surface of the belt only at the surface and softening the belt at the surface to a depth not in excess of three times the nominal grain size of the abrasive particles to be used, while retaining the interior of the belt unchanged, coating the belt at the softened surface including the point of joining with abrasive particles of the predetermined nominal size and removing the solvent.

8. The process of making an abrasive belt of accurately predetermined contour, which comprises machining a predetermined contour on the surface of a belt of synthetic linear condensation polyamide, softening the belt at the machined surface and only on the machined surface by a solvent for the linear condensation polyamide to a depth not exceeding three times the predetermined nominal grain size of the abrasive to be used, applying to the softened surface a layer of abrasive particles of the predetermined grain size, thereby imbedding the particles in the surface, while at the same time retaining unchanged the composition of the belt beneath the surface layer and retaining substantially unchanged the predetermined contour, and removing the solvent.

9. An abrasive body comprising a backing of synthetic linear condensation polyamide and abrasive particles concentrated only at the surface in a layer not exceeding in thickness three times the nominal grain size of the abrasive particles, the abrasive particles being bonded to the body by the polyamide itself, the interior of the body having an oriented structure and the polyamide at the surface around the abrasive particles having an equiaxed microcrystalline structure.

10. An abrasive body as made by the process of claim 1.

11. An abrasive body according to claim 9, which consists of a belt.

12. An abrasive body according to claim 9, in which the abrasive particles are diamond particles.

13. An endless abrasive belt adapted for polishing bearing races and carbide dies, having uniformly abrasive properties along the length of the belt comprising a band of synthetic linear condensation polyamide which is throughout the interior except at the weld of oriented form, having a weld of equiaxed microcrystalline polyamide extending across the belt and having an endless layer of abrasive particles having a thickness not in excess of three times the nominal particle size of the particles, concentrated at the surface and bonded to the belt by the polyamide itself along the length of the belt proper and also across the weld.

14. An abrasive body as made by the process of claim 1, which consists of a belt having increased thickness at the outer edges compared to the middle, having a layer of abrasive particles over the outside and under tension stretching to create a flat surface.

15. An abrasive body as made by the process of claim 1, which consists of a disc having abrasive particles concentrated on one flat face.

16. An abrasive body as made by the process of claim 1, which consists of a wheel having a convex cross section on the outer surface and having abrasive particles concentrated on such outer surface.

17. An abrasive body as made by the process of claim 1, which consists of a tool having a conical surface and having abrasive particles concentrated on such conical surface.

References Cited in the file of this patent

UNITED STATES PATENTS

| | | |
|---|---|---|
| 1,131,119 | Crandell | Mar. 9, 1915 |
| 2,035,521 | Benner et al. | Mar. 31, 1936 |
| 2,128,906 | Benner et al. | Sept. 6, 1938 |
| 2,154,436 | Catlin | Apr. 18, 1939 |
| 2,250,119 | Williamson | July 22, 1941 |
| 2,328,998 | Radford | Sept. 7, 1943 |
| 2,349,290 | Loughborough | May 23, 1944 |
| 2,350,861 | Argy et al. | June 6, 1944 |
| 2,485,765 | Oglesby | Oct. 25, 1949 |

FOREIGN PATENTS

| | | |
|---|---|---|
| 845,536 | France | Aug. 25, 1939 |